United States Patent
Yeluripati

(10) Patent No.: US 12,517,861 B2
(45) Date of Patent: Jan. 6, 2026

(54) SYSTEM AND METHOD FOR ENABLING RECONFIGURABLE AND FLEXIBLE MODULAR COMPUTE

(71) Applicant: Lightspeed Photonics Private Limited, Hyderabad (IN)

(72) Inventor: Rohin Kumar Yeluripati, Ramachandrapuram (IN)

(73) Assignee: LIGHTSPEED PHOTONICS PRIVATE LIMITED, Bangalore (IN)

( * ) Notice: Subject to any disclaimer, the term of this patent is extended or adjusted under 35 U.S.C. 154(b) by 280 days.

(21) Appl. No.: 17/916,146

(22) PCT Filed: Mar. 26, 2021

(86) PCT No.: PCT/IN2021/050318
§ 371 (c)(1),
(2) Date: Sep. 30, 2022

(87) PCT Pub. No.: WO2021/199075
PCT Pub. Date: Oct. 7, 2021

(65) Prior Publication Data
US 2023/0315487 A1    Oct. 5, 2023

(30) Foreign Application Priority Data

Apr. 2, 2020 (IN) .............................. 202041014661

(51) Int. Cl.
*G06F 15/78* (2006.01)
*G06F 1/18* (2006.01)
*H05K 7/14* (2006.01)

(52) U.S. Cl.
CPC .......... *G06F 15/7896* (2013.01); *G06F 1/181* (2013.01); *H05K 7/1497* (2013.01)

(58) Field of Classification Search
CPC .............. G06F 15/7896; G06F 15/161; G06F 15/7867; G06F 1/18; G06F 1/20; G06F 1/181; H05K 7/1497
See application file for complete search history.

(56) References Cited

U.S. PATENT DOCUMENTS 6,469,901 B1 *  10/2002  Costner ................ H05K 7/1442
                                                  361/733
8,542,492 B2 *   9/2013  Dunn, Jr. ................ H05K 5/15
                                                  324/309

(Continued)

FOREIGN PATENT DOCUMENTS

WO    WO-2015107344 A1 *  7/2015  ............. H04L 41/08

OTHER PUBLICATIONS

International Search Report mailed on Aug. 18, 2021, in connection with corresponding International Application No. PCT/IN2021/050318; 3 pages.

*Primary Examiner* — Courtney P Spann
(74) *Attorney, Agent, or Firm* — Barta Jones, PLLC

(57) ABSTRACT

A system and method for enabling reconfigurable and flexible modular compute (M). The environment (100) may include modular system (M) including a first modular system (M1), a second modular system (M2), peripheral equipments (105), a network (107), and optionally, remote user device (109). The method includes placing at least one first reconfigurable block of one or more reconfigurable blocks on a first modular platform, placing at least one second reconfigurable block of one or more reconfigurable blocks on a second modular platform, placing a plurality of components surrounding the first reconfigurable block and the second reconfigurable block on respective the first modular platform and the second modular platform, configuring one (Continued)

or more interconnections between the plurality of components to form a modular network.

10 Claims, 7 Drawing Sheets

(56) References Cited

U.S. PATENT DOCUMENTS

| | | | |
|---|---|---|---|
| 10,201,109 B2 * | 2/2019 | Dunn, Jr. | H05K 7/1498 |
| 10,374,885 B2 | 8/2019 | Liguori et al. | |
| 2005/0044284 A1 * | 2/2005 | Pescatore | G06F 13/4009 |
| | | | 710/15 |
| 2012/0075795 A1 * | 3/2012 | Petruzzo | G06F 1/181 |
| | | | 361/679.48 |
| 2013/0061624 A1 * | 3/2013 | Zwinkels | H05K 7/1497 |
| | | | 312/223.1 |
| 2018/0025299 A1 | 1/2018 | Kumar et al. | |
| 2018/0167268 A1 * | 6/2018 | Liguori | G06F 16/00 |

* cited by examiner

SYSTEM AND METHOD FOR ENABLING RECONFIGURABLE AND FLEXIBLE MODULAR COMPUTE

CROSS-REFERENCE TO RELATED APPLICATIONS

This application is a National Stage application of International Patent Application No. PCT/IN2021/050318, filed on Mar. 26, 2021, which claims priority to Indian Application 202041014661, filed Apr. 2, 2020, each of which is hereby incorporated by reference in its entirety.

TECHNICAL FIELD

The present invention relates to computer technology domain. More specifically, the invention relates to systems and methods for enabling reconfigurable and flexible modular compute for high-performance computing systems. The invention also provides said modular compute of the system.

BACKGROUND

Higher integration has become a trend in modern electronic packaging. One of the major challenges is to improve the thermo mechanical reliability when the package is subjected to the thermal loads. However, the conjunct interfaces near the free edge always suffer high stress gradients and even can generate cracks, because the packaging components are fabricated with different thermal and mechanical properties.

Traditionally, chip manufacturers connect two monolithic central processing units (CPUs) together in a multichip module (MCM). An MCM is a package with pins where multiple integrated circuits, or chips (ICs), semiconductor dies, and/or other components are integrated. This is usually done on a unifying substrate, so when the MCM is in use it can be treated as if it were one large chip. An MCM is sometimes referred to as a hybrid IC. Chiplets are the individual ICs that make up an MCM. They provide a way to minimize the challenges of building with cutting-edge transistor technology. In recent days, the chiplet technology largely applied to scale beyond moore's law.

Further to reduce the warpage as well as to improve the reliability of chip packages certain technologies are under development. For example, some types of clips are described to reduce the warpage by clamping the substrate or holding the chip onto the substrate when dispensing and curing an underfill material. Also, a variety of stiffener rings or lids are provided to reduce the warpage of the substrate of chip packages. However, the conventional stiffener rings are to constrain the thermal deformation of the substrate, not bonding to the sides of the chip for constraining the thermal deformation of the chip.

Currently, manufactures manage power consumption and thermal issues in multicore devices by throttling the processing clock frequency of the multiple processor cores. Throttling the processing clock frequency of multiple processor cores of the multicore devices can help manage power consumption and thermal issues by reducing the rate of work accomplished by the multicore processors. However, this technique focuses on managing these issues at the expense of performance.

Data processing demands are increasing in as numbers of consumers are increasing rapidly. Data centers are expected to operate at a high speed without compensating much on power. Further, the data processing demands are increasing, users expect to maintain a certain level of performance on their mobile devices in terms of processing speed and battery life. Maintaining the user expected level of performance on a mobile device creates a dilemma of whether to sacrifice performance for longevity, or sacrifice longevity for performance, all while managing the thermal issues of the multicore processors.

However, it is highly desirable to provide improved computer architectures and methods for providing and using such architectures that provide sufficient speed performance in large scale parallel processing data centers, while maintaining or reducing their power consumption. Such architectures should allow conventional software and operating systems to be employed where possible so that serial tasks are still available, but those tasks involving parallel operations can be achieved at significantly increased performance thereby reducing the burden to employ more numerous, and more powerful processors to expand capacity.

In data centers, temperature is the foremost environmental threat to computer equipment. Countless amounts of servers become damaged due to improper thermal management. The air around your servers needs to be maintained in the range of 68° to 72° F. (20° to 24° C.) for optimal reliability. Not only the heat produced by the servers, but also account for outside influences that will have an impact on the room's temperature. It is critical to have visibility on the temperature of your server room or data center at all times.

For example, proper airflow circulation and keeping hot and cold air separated. There exists certain tools to help manage airflow include rack-mounted fans and blanking panels which can help direct and contain airflow. In case of multiple racks setting up a hot and cold aisle system can also help manage airflow. In addition to the hot and cold aisle setup, a partial containment setup will also help prevent hot and cold air from mixing by preventing the air from escaping each aisle. However, these methods become a liability for the organization since the methods involve high investment and costly maintenance.

Further, in the case of re-configuring the servers in a data center or/and in upgrading the data center infrastructure, procurement and deployment of resources is always a hectic process both in terms of technical as well as amount of manual work involved.

Hence, there is a need for a system which is easily assemble-able/connect-able/integratable, modular, flexible compute blocks for creating computer systems, networks, topologies, and architectures as needed. Further, a system where cooling is made efficient using simple heat sink technology rather than using a complex cooling methodologies.

1. The primary objective of the present invention is to provide a "SYSTEM" for enabling reconfigurable and flexible Modular Compute in a network environment for high performance and flexible computing.

2. It is the objective of the invention to provide a high performance and flexible computing network consisting of modular reconfigurable compute units that can be a plug-in replacement.

3. Another primary objective of the present invention is to provide a "METHOD" for the above system for enabling reconfigurable and flexible Modular Compute in a network environment for high performance and flexible computing.

4. Another primary objective of the present invention is to provide a "MODULAR COMPUTE" which comprises reconfigurable and flexible Modular Systems in a network environment for high performance and flexible computing.

5. It is the objective of the invention to provide a "system" and "method" performed using the reconfigurable, flexible, advanced "modular compute" system of the present invention to enable easily assemble-able/connect-able/integratable, modular, flexible compute blocks for creating computer systems, networks, topologies, and architectures as needed.

6. It is the objective of the invention to provide a "system" and "method" performed using the "modular compute" system of the present invention to provide efficient and simple cooling of devices and computing systems in the architecture of the network environment and data center.

SUMMARY

The present invention provides a system and method for reconfigurable and flexible modular compute. The modular compute system comprises placing at least one first reconfigurable block of one or more reconfigurable blocks on a first modular platform, placing at least one second reconfigurable block of one or more reconfigurable blocks on a second modular platform, placing a plurality of components surrounding the first reconfigurable block and the second reconfigurable block on the respective the first modular platform and the second modular platform and configuring one or more interconnections between the plurality of components to form a modular network.

Further, enabling reconfiguration of modular compute system that comprises at least one memory to store instructions and at least one processor execute the instructions. The reconfiguration may comprise functions associated with the modular block. Further, the platform may comprise at least one memory configured to store instructions and at least one processor configured to execute the instructions regarding one or more operations including but not limited to computing, communication and the like.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

Following are the aspects of the present invention:

(1) A System for enabling reconfigurable and flexible modular compute for high-performance computing.

(2) A Method for enabling reconfigurable and flexible modular compute for high-performance computing.

(3) A Modular compute comprising modular systems for reconfigurable, flexible, and high-performance computing.

(4) A Modular system for modular systems for reconfigurable, flexible, and high-performance computing.

System, Method, Modular compute, and modular system for reconfigurable, flexible, and high-performance computing as shown and represented in accompanying FIGS. 1-6.

A system for enabling reconfigurable and flexible Modular Computes (M) in a network environment (100) for high performance computing, characterized in that: the system comprises components:

(i) plurality of modular systems (Mn), each modular system (M) comprises:
a reconfigurable block (305);
communication interface (205) to enables the internal and external communications of each modular system (M);
a modular platform (301) with communication components (303);
the reconfigurable block (305) and communication interface (205) are distributed on said modular platform (301) forming the modular system (M);

(ii) peripheral equipments (105) to send and receive data/information, and (iii) optionally, remote device (109) for user to send and receive notifications and communicate remotely;
all the components (Mn, 105 and 109) communicatively coupled through a network (107) forming the modular network environment (100), wherein the said network (107) enables each system components (Mn, 105 and 109) to send and receive data/information between the system components for communications;
wherein, each modular system (M) is configurable, reconfigurable, and replaceable independently, without altering the architecture of the modular network created within the network environment (100).

The system enables convenient and flexible addition or removal or upgrading of one or more modular system (M) without altering the architecture of the modular network present within the network environment (100).

Each reconfigurable block (305) of each modular compute (M) comprises:
One or more Memory (203) to store instructions,
On or more Processor (201) configured to execute the instructions stored in the memory (203).

Each of the reconfigurable block (305) comprising Memory (203) and Processor (201) and the Communication Interface (205) are placed and distributed on a platform (301), and combinedly forms a single modular system (M) or single modular compute (M).

Said modular platform (301) comprises: one or more memory configured to store instructions and one or more processor configured to execute the instructions regarding one or more operations of the modular platform (301).

Said modular platform (301) comprises: communication components (303) surrounding the said reconfigurable block (305), wherein configuration of one or more interconnections between the communication components (303) of the modular platform (301) and also with the communication interface (205) forms a modular network.

The platform (301) comprises multiple sides forming a modular system (M), wherein each side of the platform (301) comprises one or more row(s) to accommodate communication component (303).

Said communication component (303) comprises a plurality of components distributed in one or more row(s) on each side of the modular platform (301).

Each side of the said modular platform (301) comprises four rows (a,b,c,d) comprising four groups of communication components (303a, 303b, 303b, 303d) distributed as follows:
Communication Component (303a) on First Row (a) of the Platform (301),
Communication Component (303b) on Second Row (b) of the Platform (301),
Communication Component (303c) on Third Row (c) of the Platform (301), and Communication Component (303d) on Fourth Row (d) of the Platform (301).

Said communication component (303) comprises a plurality of components distributed in four row(s) on each side of a six sides (hexagonal) platform (301).

Said configured modular platform (301) and the network;

enables inter commute i.e. enables to perform the functions of commuting of one modular system (M) with one or more modular systems (M) within the network environment (100), and enables intra commute i.e. enables to perform tasks and/or functions related to communication within the modular system (M) i.e. intra commute of the modular system.

Said communication components (303) are surrounding the reconfigurable block (305) comprises commuting elements and drivers therefor.

The instruction comprises a set of computer readable instructions or data set stored in memory (203) which is required for the processor (201) to run/operate/function.

The computer readable instructions or data set stored in memory (203) which comprises one or more executable instruction selected from group comprising of: application, content, software, firmware, code, and algorithm or combination thereof.

Each modular compute (M) has an interconnecting algorithm that is scalable to connect to one or more other modular computes (M) of the system.

The communication interface (205) enables the internal and external communications of the modular compute (M). The peripheral equipments (105) enables to send and receive data/information.

The remote device (109) is optional and when connected and/or used in the system enables user to send and receive notifications and communicate with the system remotely. In one embodiment, the system comprises one or more remote device (109) connected with the network of the system to communicate wirelessly.

Said configuration and reconfiguration of modular system and/or modular compute (M) is performed to enable the processor (201) of each modular system (M) to execute the functions and thus functionalize the modular system (M) to perform the require tasks of the network environment (100).

Said configuration of each modular system (M) of the system comprises enabling configuration of memory (203) to store instructions and thereby enabling the associated processor (201) to execute the stored instructions, wherein the configuration comprises functions associated with the configurable modular block (305).

Said reconfiguration of each modular system (M) of the system comprises enabling reconfiguration of memory (203) to store instructions and thereby enabling the associated processor (201) to execute the stored instructions, wherein the reconfiguration comprises functions associated with the reconfigurable modular block (305).

Said configuration and reconfiguration of the memory (203) of the processor is performed either locally or remotely. Said configuration and reconfiguration of the memory (203) of the processor is performed either by physical connection or remotely via wireless connection. In one embodiment, said configuration and reconfiguration of the memory (203) can be performed by the remote device (109) or locally connecting a device.

Said replacement of each modular system (M) of the system comprises:
(a) removal of the complete modular system or modular compute (M) from the system and placing another complete modular system or modular compute (M), or
(b) removal of the reconfigurable modular block (305) of a modular system (M) and placing another reconfigurable modular block (305) in said modular system (M) from which a block is removed.

Due to the reconfigurability of each modular system (M) of the plurality of modular systems or modular computes (M) in the system, achieved using the reconfigurable modular block (305) and the components (303) placed on the modular platform (301); the network environment (100) of the system enables flexibility in operation and execution of one or more tasks.

The system comprises an operating system, that enables each of the modular compute (M) or modular system (M) to perform one or more of the functions of configuration, reconfiguration, execution, operation, communication of the system. In one embodiment, the operating system may be instruction stored in memory. Without disrupting the network architecture or other modular system and/or modular computes in the system, each of the modular system (M) and/or each modular compute is configurable, reconfigurable, and replaceable; which ultimately enables the system flexibilities in establishment, repairing, restructuring, and upgrading the architecture of the network environment (100).

Each modular system (M) can be a system or part of the system. Any modular system (M) in the system can be the Master modular system (M) or Supervisor modular system (M). Any modular system (M) in the system can be a processing node reporting to the master or supervisor.

The environment (100) is a data center (100a) wherein network is formed on server self (401) having a one or more server racks (409). The environment (100) comprises multiple clusters of modular system (Mn), wherein each cluster comprises a group of modular systems, able to communicate among the clusters and also within the modular systems of a single cluster. The environment (100) comprises a data center (100a) wherein network is formed on server self (401) having a one or more server racks (409).

In another aspect the invention provides a reconfigurable and flexible Modular compute (M) having one or more of Modular system (Mn) in a network environment (100) for computing, characterized in that: the modular system of the compute comprises:
(i) one or more modular system (Mn), each modular system (M) comprises:
a reconfigurable block (305);
communication interface (205) to enables the internal and external communications of each modular system (M);
a modular platform (301) with communication components (303); and
the reconfigurable block (305) and communication interface (205) are distributed on said modular platform (301) forming the modular system (M);
(ii) peripheral equipments (105) to send and receive data/information; and
(iii) remote device (109) for user to send and receive notifications and communicate remotely;
all the components (Mn, 105 and 109) communicatively coupled through a network (107) forming the modular network environment (100), wherein the said network (107) enables each system components (Mn, 105 and 109) to send and receive data/information between the system components for communications;

wherein, each modular system (M) is configurable, reconfigurable, and replaceable independently, without altering the architecture of the modular network created within the network environment (100).

The Modular compute, wherein the Modular system (M) enables convenient and flexible addition or removal or upgrading of one or more modular system (M) without altering the architecture of the modular network present within the network environment (100).

The Modular compute, wherein each reconfigurable block (305) of each modular system (M) comprises:

One or more Memory (203) to store instructions,

One or more Processor (201) configured to execute the instructions stored in the memory (203).

The Modular compute, wherein said modular platform (301) comprises: one or more memory configured to store instructions and one or more processor configured to execute the instructions regarding one or more operations of the modular platform (301).

The Modular compute, wherein said modular platform (301) comprises: communication components (303) surrounding the said reconfigurable block (305), wherein configuration of one or more interconnections between the communication components (303) of the modular platform (301) and also with the communication interface (205) forms a modular network.

The Modular compute, wherein the platform (301) comprises multiple sides forming a modular system (M), wherein each side of the platform (301) comprises one or more row(s) to accommodate communication component (303).

The Modular compute, wherein said communication component (303) comprises a plurality of components distributed in one or more row(s) on each side of the platform (301) and wherein each side of the said platform (301) comprises four rows (a,b,c,d) comprising four groups of communication components (303*a*, 303*b*, 303*b*, 303*d*) distributed as follows:

Communication Component (303*a*) on First Row (a) of the Platform (301), Communication Component (303*b*) on Second Row (b) of the Platform (301), Communication Component (303*c*) on Third Row (c) of the Platform (301), and Communication Component (303*d*) on Fourth Row (d) of the Platform (301).

The Modular compute, wherein said communication component (303) comprises a plurality of components distributed in four row(s) on each side of a six sides (hexagonal) platform (301), wherein said configured modular platform (301) and the network;

enables inter commute i.e. enables to perform the functions of commuting of one modular system (M) with one or more modular systems (M) within the network environment (100), and enables intra commute i.e. enables to perform tasks and/or functions related to communication within the modular system (M) i.e. intra commute of the modular system.

In another aspect, the invention discloses a reconfigurable and flexible modular compute, which comprises:

first reconfigurable block of one or more reconfigurable blocks on a first modular platform;

second reconfigurable block of one or more reconfigurable blocks on a second modular platform;

a plurality of components surrounding the first reconfigurable block and the second reconfigurable block on the respective the first modular platform and the second modular platform;

one or more interconnections between the plurality of components to form a modular network;

one or more Peripheral Units that communicate to the external entities; and the said system being capable of configured remotely or locally.

The system, modular system and modular compute respectively as described above, wherein a method of geometrically arranging the said modular system (M) and the reconfigurable blocks (305) enables inter-module communication and wherein a method of geometrically arranging the said modular system (M) and the reconfigurable blocks (305) enables inter-module communication, wherein the method comprises following steps 501-507:

Step-501: placing one or more first reconfigurable block of one or more reconfigurable blocks on a first modular platform;

Step-503: placing one or more second reconfigurable block of one or more reconfigurable blocks on a second modular platform;

Step-505: placing a plurality of components surrounding the first reconfigurable block and the second reconfigurable block on the respective the first modular platform and the second modular platform;

Step-507: configuring one or more interconnections between the plurality of components to form a modular network.

A method for enabling reconfigurable and flexible modular compute for high-performance computing, wherein the method comprises following steps:

Step-501: placing one or more first reconfigurable block of one or more reconfigurable blocks on a first modular platform;

Step-503: placing one or more second reconfigurable block of one or more reconfigurable blocks on a second modular platform;

Step-505: placing a plurality of components surrounding the first reconfigurable block and the second reconfigurable block on the respective the first modular platform and the second modular platform;

Step-507: configuring one or more interconnections between the plurality of components to form a modular network.

This summary is provided to introduce a selection of concepts in a simplified form that are further described below in the Detailed Description. This summary is not intended to limit the key features or essential features of the claimed subject matter, nor is it intended to be used as an aid in determining the scope of the claimed subject matter.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1(a) illustrates a general system for network environment (100), for enabling reconfigurable and flexible modular compute (M), comprising "n" no of modular system (Mn) in accordance with present invention.

FIG. 1(b) illustrates a system for network environment (100), for enabling reconfigurable and flexible modular compute (M) comprising modular systems (M1,M2), in accordance with an example embodiment of present invention.

DETAILED DESCRIPTION

Figure 1A:
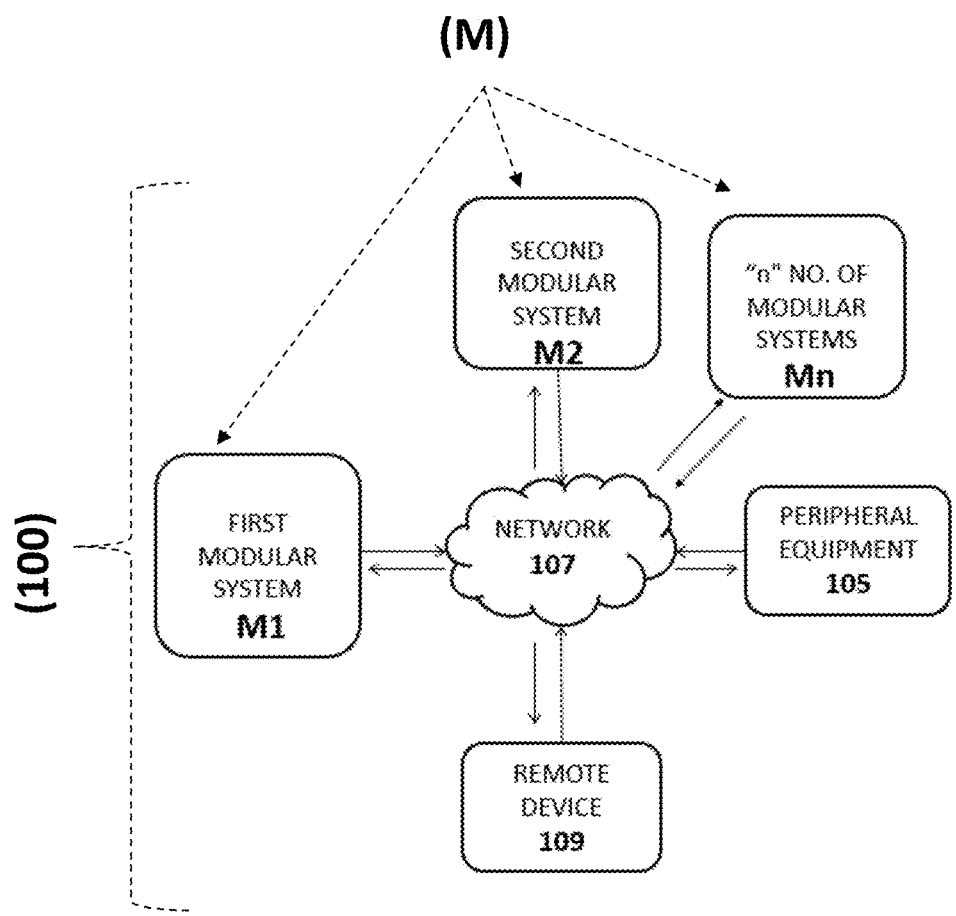
FIGS. 1(a) and 1(b) both illustrate a system for network environment (100) in accordance with the present invention.

The invention discloses a "system" and "method" for enabling reconfigurable and flexible modular compute for high-performance computing systems. The invention also discloses a "modular compute" of the system.

The "system" and "method" performed using the reconfigurable, flexible, advanced "modular compute" system of the present invention enable easily assemble-able/connectable/integratable, modular, flexible compute blocks for creating computer systems, networks, topologies, and architectures as needed.

In addition to high performance, high speed, flexibility, reconfigurability, reduced cost and labour, and easy maintenance, the "system" and "method" based on said "modular compute" of the invention also provide efficient and simple cooling of devices and computing systems in the architecture of the network environment and data center, wherein cooling is made efficient using simple heat sink technology rather than using a complex cooling methodologies.

Reference will now be made in detail to the description of the present subject matter, one or more examples of which are shown in representative FIGS. 1-6. Each example is provided to explain the subject matter and not a limitation. Various changes and modifications obvious to one skilled in the art to which the invention pertains are deemed to be within the limit, scope and contemplation of the invention.

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The word "exemplary" is used herein to mean "serving as an example, instance, or illustration". Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed. Further, in this description "application" may include files with executable content created based on Hardware description language (HDL), where HDL is a specialized computer language used to program electronic and digital logic circuits. The structure, operation and design of the circuits are programmable using HDL. HDL includes a textual description consisting of operators, expressions, statements, inputs and outputs.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Following are the aspects of the present invention:
(1) A System for enabling reconfigurable and flexible modular compute for high-performance computing.

(2) A Modular compute comprising modular systems for reconfigurable, flexible, and high-performance computing.

(3) A Modular system for modular systems for reconfigurable, flexible, and high-performance computing.

(4) A Method for enabling reconfigurable and flexible modular compute for high-performance computing.

In first aspect, the present invention is to provides a System for enabling reconfigurable and flexible modular compute for high-performance computing in a network environment. The system comprises modular reconfigurable compute units (blocks of a modular compute) that can be a plug-in replacement, when required.

The system of first aspect comprises and involves the Modular compute of second aspect and modular systems of third aspect.

The modular compute is configurable, reconfigurable, and replaceable independently, without altering the architecture of the modular network created within the network environment, thus make the system high performance and flexible.

The system by the help of plug-in replacement and/or reconfigurable modular block present in each modular system of modular compute, enables convenient and flexible addition or removal or upgrading of one or more modular compute of plurality of modular computes of the system without altering the architecture of the modular network present within the network environment.

In one embodiment of this first aspect, the invention provides a system for enabling reconfigurable and flexible Modular Compute (M) in a network environment (100) for high performance computing as shown in FIG. 1, wherein the system comprises following components:

Modular compute (M) comprising plurality i.e. two or more of modular system (M1, M2, . . . Mn) for reconfiguration, plug-in replaceable and flexible computing, peripheral equipments (105) to send and receive data/information, and optionally, remote device (109) for user to send and receive notifications and communicate remotely;

a network (107) forming the modular network environment (100), wherein the said network (107) enables each system components (M, 105 and 109) to send and receive data/information between the system components for communications.

The said reconfigurable and flexible modular compute comprises:

first reconfigurable block of one or more reconfigurable blocks on a first modular platform;

second reconfigurable block of one or more reconfigurable blocks on a second modular platform;

a plurality of components surrounding the first reconfigurable block and the second reconfigurable block on the respective the first modular platform and the second modular platform;

one or more interconnections between the plurality of components to form a modular network;

one or more Peripheral Units that communicate to the external entities;

the said system being capable of configured remotely or locally;

a method of geometrically arranging the said modular reconfigurable blocks to enable inter-module communication.

In the above said plurality of Modular system (Mn) comprises two or more of modular system (M1, M2, . . . Mn), wherein "n" represents the total number of modular systems that can be connected and present in the system of the invention, wherein "n" is any integer number of the counting system.

However, only one modular system can also be used in an environment for computing and in that case "n" is 1.

In one embodiment the system of the invention uses plurality of modular system (Mn) wherein "n" in "Mn" represents {2, 3, . . . n}. FIG. 1a illustrates a general system for network environment (100), for enabling reconfigurable and flexible modular compute (M), comprising "n" no of modular systems (Mn) in accordance with present invention.

Figure 1B:
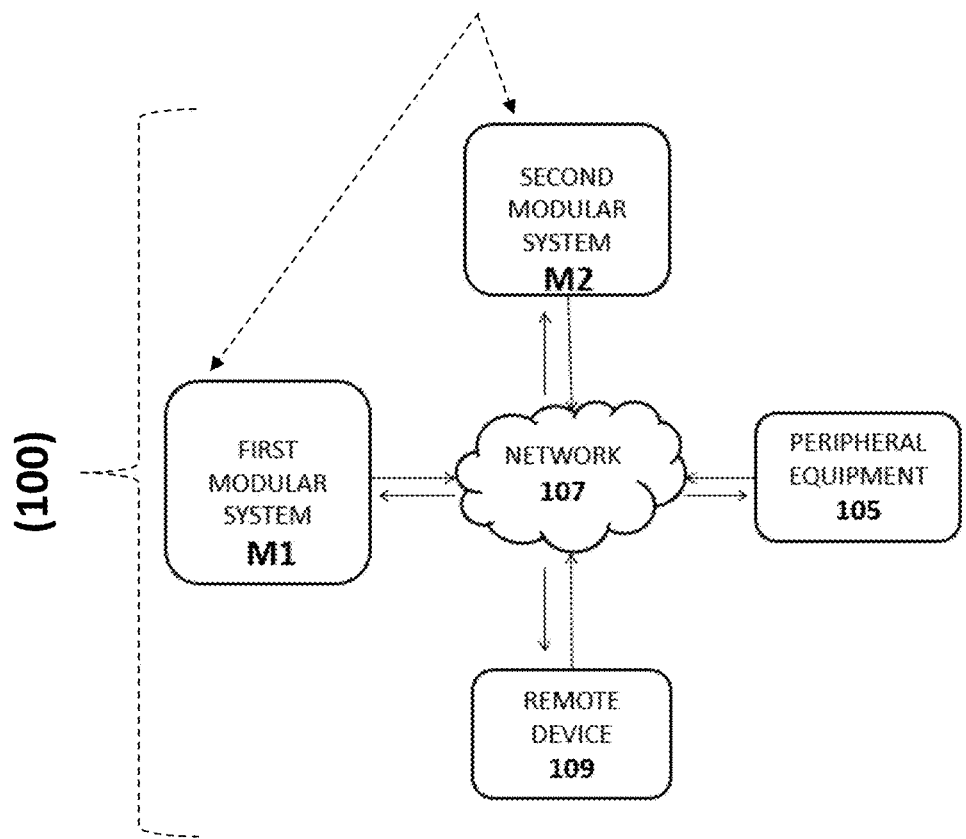

In one embodiment, the system comprises plurality of modular systems i.e. at least two modular systems. FIG. 1b illustrates a system for network environment (100), for enabling reconfigurable and flexible modular compute (M) comprising modular systems (M1,M2), in accordance with an example embodiment of present invention.

Referring now to the drawings, FIG. 1b illustrates an environment (100) within which reconfigurable and flexible modular compute may be implemented. The environment (100) may include modular system (M) comprising a first modular system (M1), a second modular system (M2), peripheral equipments (105), a network (107), and optionally, remote user device (109).

Figure 4:
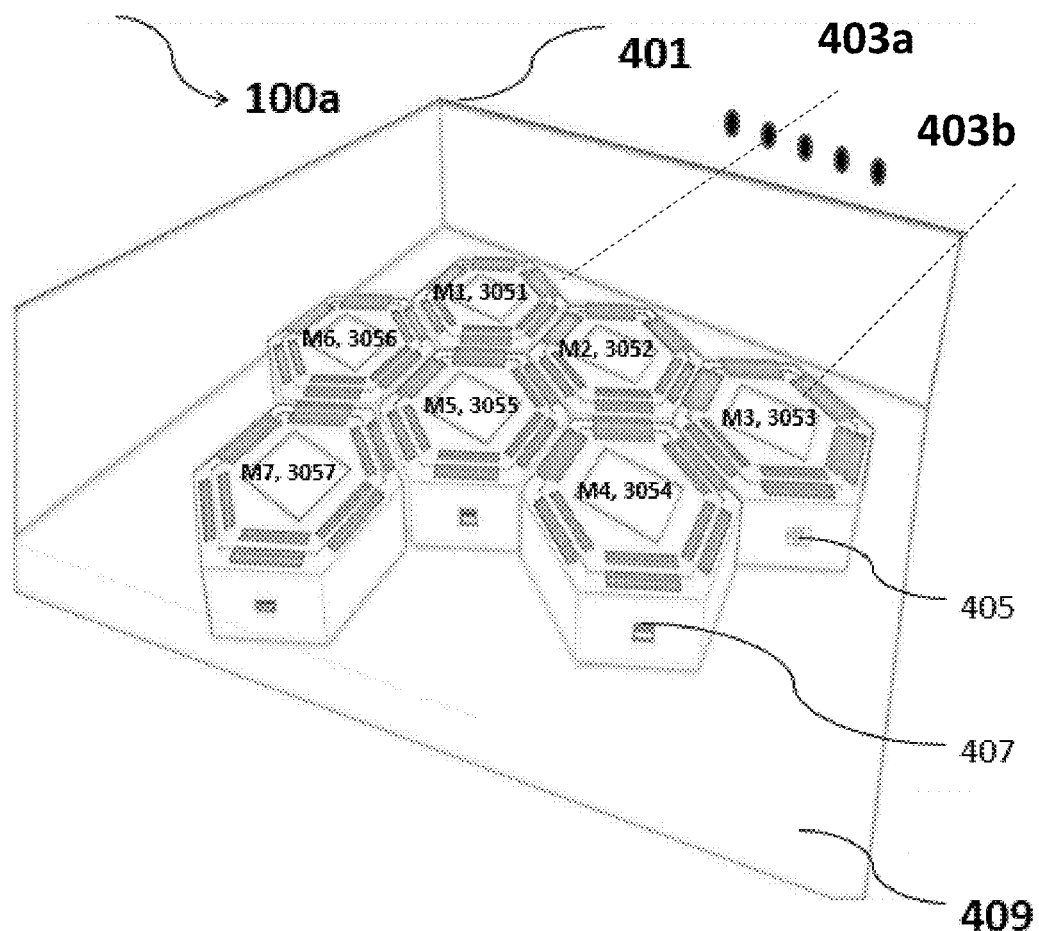
FIG. 4 illustrates a modular network environment of a data center (100a) formed by modular compute (M) using seven modular systems (M1, M2, . . . M7), in accordance with an example embodiment.

The embodiment as shown in FIG. 1b and also FIG. 4 are covered with the general embodiment as shown in FIG. 1a.

Each modular system (M) can be a system or part of the system. Any modular system (M) in the system can be the Master modular system (M) or Supervisor modular system (M). Any modular system (M) in the system can be a processing node reporting to the master or supervisor.

Referring now to FIG. 1a generally representing a system comprising "n" number of modular systems (Mn) in a modular compute (M), wherein "n" in "Mn" represents {2, 3, . . . n}. As shown in the FIG. 1a, the first modular system (M1) may communicatively coupled to the second modular system (M2) through a network (107). The modular compute (M) may comprise "n" no. of modular systems. Thus as shown in FIG. 1a, the modular compute (M) comprises plurality of modular systems (M1, M2, . . . Mn) wherein said plurality of modular systems are communicatively connected to each other via the network (107) wherein each modular system can both send and receive data/information (arrow marks) into the system. In some example embodiments, the first modular system (M1), the second modular system (M2) and up to many numbers of modular systems ("n" numbers) may also be collectively referred as modular compute (M). Further details regarding the modular compute may be found in the later part of the disclosure.

Figure 6:
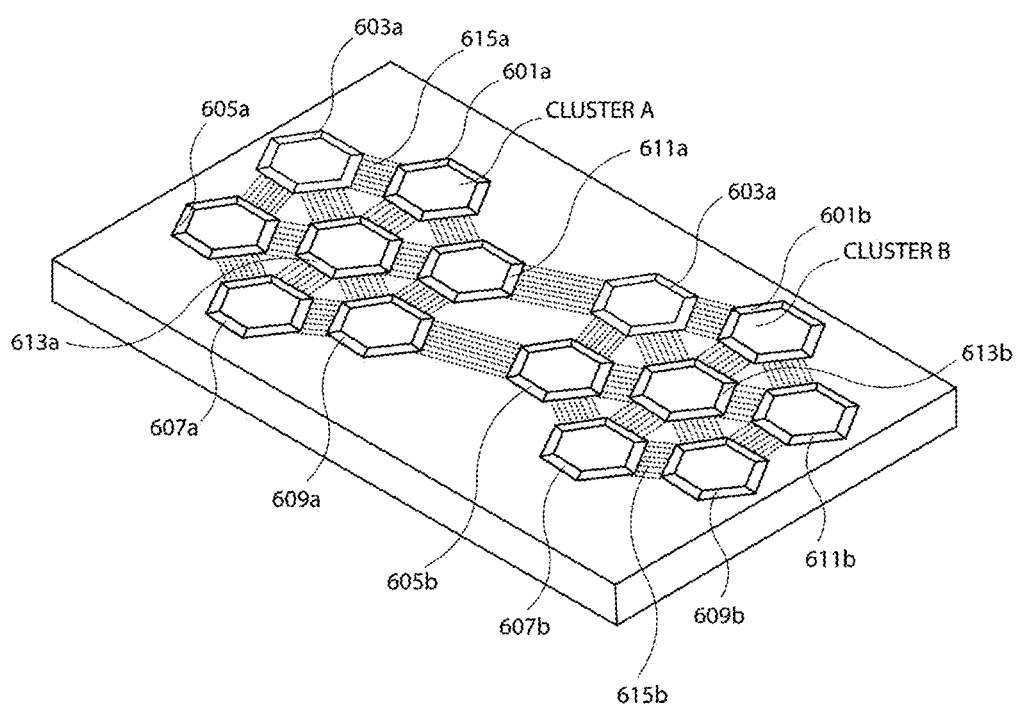
FIG. 6 generally illustrates a rack of a modular network environment (100b) formed by two clusters (Cluster A and Cluster B) of modular computes (M) communicatively configured and interconnected on a server rack, each cluster comprising seven modular systems (M1, M2, . . . M7), in accordance with an example embodiment.

Further in one embodiment, the modular compute (M) is provided in a special geometrical configuration such as clusters, each cluster comprising plurality of modular systems (as shown in FIG. 6).

In one embodiment a single modular compute (M) may be in a cluster which comprises seven numbers of modular systems (M1, M2, . . . M7). Plurality of clusters can be interconnected.

In an example embodiment a peripheral equipment (105) may receive and/or send data through the network (107). In some example embodiments input/output ports (I/O ports) on the modular compute (M) enabled communication via the network (107). I/O ports are also present on each modular system of the modular compute. Peripheral equipment (105) may include but not limited to keyboard, mouse, touch screen, pen tablet, joystick, MIDI keyboard, scanner, digital, camera, video camera, microphone monitor, projector, TV screen, printer, plotter, speakers, external hard drives, media card readers, digital, camcorders, digital mixers, MIDI equipment and the like.

The network (107) may include the Internet or any other network capable of communicating data between components present in the system such as modular compute (M) comprising modular systems, peripheral equipments (105) and devices (109) and also other equipments/devices those may be connected to the system. Suitable networks may include or interface with any one or more of, for instance, a local intranet, a Personal Area Network (PAN), a Local Area Network (LAN), a Wide Area Network (WAN), a Metropolitan Area Network (MAN), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, Digital Subscriber Line (DSL) connection, an Ethernet connection, an Integrated Services Digital Network (ISDN) line, a dial-up port such as a V.90, V.34 or V.34bis analog modem connection, a cable modem, an Asynchronous Transfer Mode (ATM) connection, or an Fiber Distributed Data Interface (FDDI) or Copper Distributed Data Interface (CDDI) connection.

Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), RIM (Research in Motion, Limited) duplex paging network, Bluetooth radio, or an IEEE 802.11-based radio frequency network. The network (107) can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. In some example embodiments, network may further include free space communications.

In an alternative embodiment, dedicated hardware implementations, such as application specific integrated circuits, programmable logic arrays and other hardware devices, can be constructed to implement one or more of the systems and methods described herein. Applications that may include the apparatus of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In an example embodiment, remote device (109) may be communicatively coupled to a modular compute (M1 and/or 1M2 and/or Mn) via the network (107). The user device (109) may include mobile phone, laptops, desktops and the like. In some example embodiment, the remote device (109) may receive a plurality of notification based on one or more functions associated with the modular systems (M1 and/or M2 and/or Mn).

Figure 2:
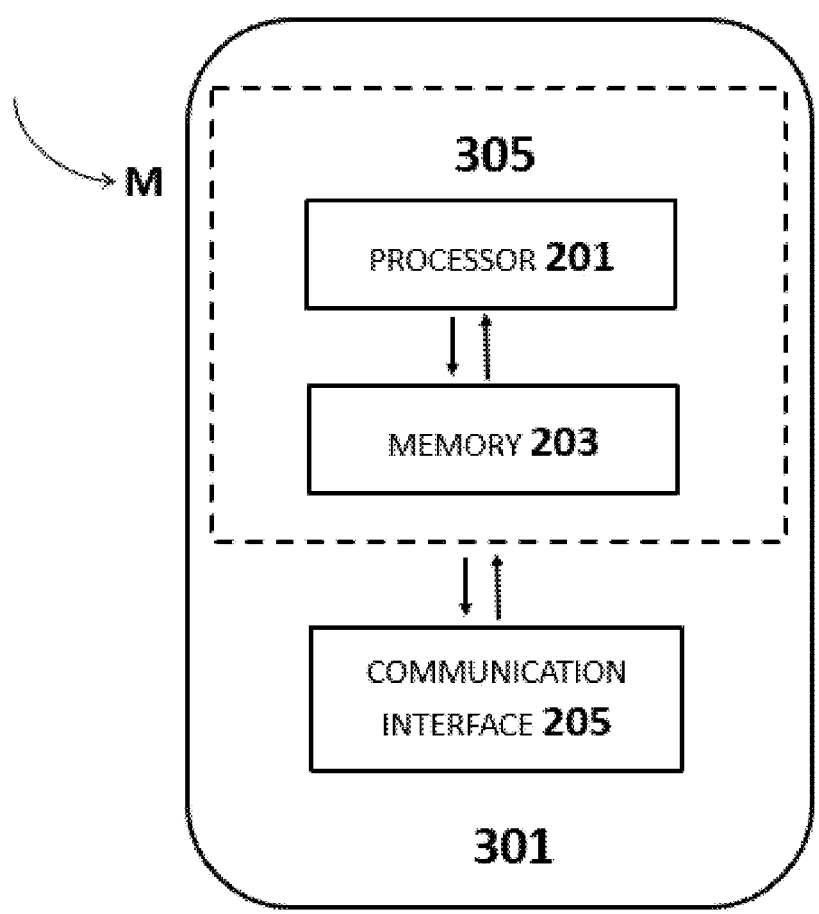
FIG. 2 illustrates a block diagram of modular system (M), according to one embodiment of the invention.

FIG. 2 illustrates a block diagram of a single modular system (M1 or M2 or Mn) of the modular compute (M). Each modular system comprises one or more reconfigurable block (305) and one or more communication interface (205) provided on a platform (301). In one embodiment, the platform (301) is a modular platform. The said one or more reconfigurable block (305) further comprises:

one or more processor (201), and one or more memory (203).

The said reconfigurable block (305) along with memory (203) and processor (201), communication interface (205) and platform (301) are interconnected and can send and receive data/information. In one embodiment, the platform (301) is a modular platform.

In accordance with an embodiment, the processor (201) may be of any type of processor, such as an "n-bit processors". Where value of n may be $2^x$, whereas values of x may range from 4 to 8. Processor types other than these, as well as processors that may be developed in the future, are also suitable. The processor may include general processor such as x86, x86-64, ARM, RISC-V, ISA based processors, Digital Signal Processing (DSP) chip, an Application Specific Integrated Circuit (ASIC), Field Programmable Gate Arrays (FPGAs), microcontroller firmware, boot loader or a combination thereof.

Processors (201) suitable for the execution of a computer program include, by way of example, both general and special purpose microprocessors, and anyone or more processors of any kind of digital computer. Generally, a processor (201) receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

The processes and logic flows described in the specification can be performed by one or more programmable processors executing one or more computer programs to perform functions by operating on input data and generating output. The processes and logic flows can also be performed by, and apparatus can also be implemented as, general purpose logic circuitry, e.g., a field programmable gate array (FPGA) and, as special purpose logic circuitry, e.g. an application specific integrated circuit (ASIC).

In accordance with an embodiment, the memory (203) includes both dynamic memory (e.g., RAM, magnetic disk, writable optical disk, NVMe, SSD etc.) and static memory (e.g., ROM, CD-ROM, etc.) for storing executable instructions that when executed perform the inventive steps described further in the document.

Communication interface (205) comprises components those enable communication and data/information transfer of one of the modular system with other modular system in the system. These Communication interfaces (205) are provided in the modular system and/or the modular platform (301) of the modular system. In one example embodiment, the Communication interface (205) may include a standard communication such as serial connection ports, USB ports, ethernet ports etc.

In accordance with an embodiment, network includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, ZigBee satellite, mobile ad-hoc network (MANET), and the like, or any combination thereof.

Although the present specification describes components and functions that may be implemented in particular embodiments with reference to particular standards and protocols, the invention is not limited to such standards and protocols. For example, The ZigBee or ZigBee/IEEE 802.15.4 protocol is a specification created for wireless networking. It includes hardware and software standard design for WSN (Wireless sensor network) requiring high reliability, low cost, low power, scalability and low data rate. Accordingly, replacement standards and protocols having the same or similar functions as those disclosed herein are considered equivalents thereof.

Figure 3:
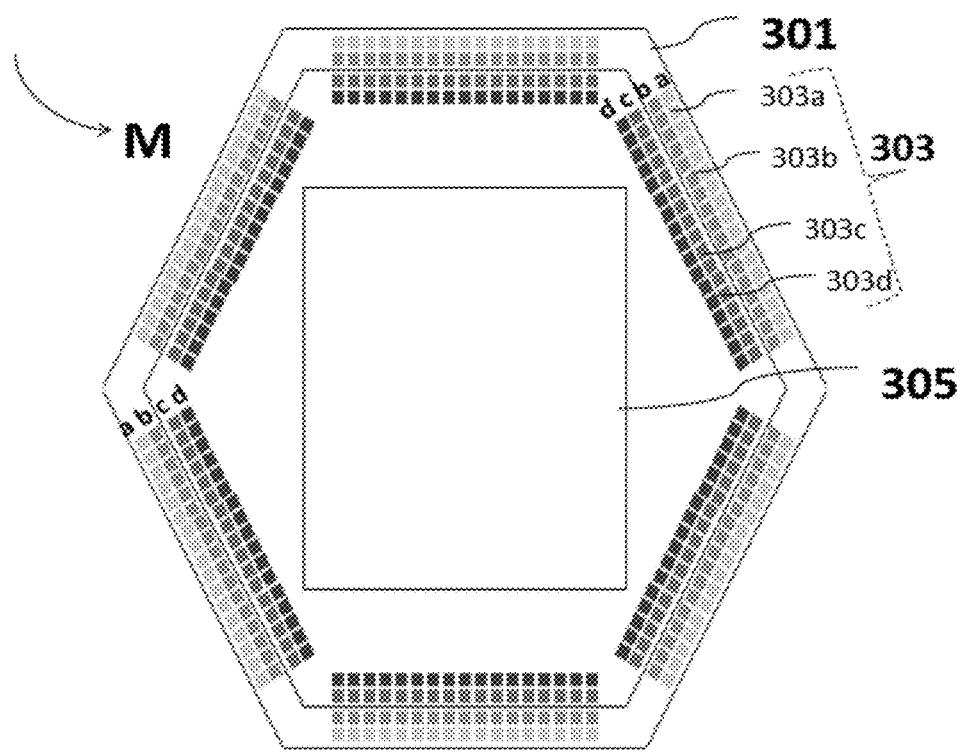
FIG. 3 illustrates a structural diagram of reconfigurable block (305) on a modular platform (301) of a single modular system (M), in accordance with an example embodiment.

In accordance with an embodiment, the modular system (M1 and/or M2 and/or Mn) comprises a special geometric configuration where the one or more processor (201), may include the at least one or more memory (203) and the at least one or more communication interface (205) is distributed on a modular platform (301) as shown in FIG. 3.

FIG. 3 illustrates a structural diagram of reconfigurable block (305) on a modular platform (301) of a single modular system (M), in accordance with an example embodiment. As shown in FIG. 3 each modular system comprises a reconfigurable block (305) on a modular platform (301). The modular platform (301) further comprises a plurality of components collectively referred as (303). In some example embodiment, modular platform (301) along with the plurality of components (303) and the modular block (305) may perform functions of the modular system (i.e modular system M1 and/or modular system M2 and/or Mn). Herein after, in the disclosure modular platform (301) along with the plurality of components (303) and the modular block (305) may be referred as a "hex compute".

The said hex compute (a modular system) comprises six sides forming an enclosure, within which the reconfigurable modular block (305) is placed. The reconfigurable modular block (305) may be placed in the modular platform by the help of circuit board and that the reconfigurable modular block (305) may be easily plug-in into the circuit board or plug-out from the circuit board.

In some example embodiments, the modular platform (301) may perform tasks and/or functions related to communication within the hex commute. In some example embodiment, the communication within the hex commute may be referred as intra commute in a hex compute. In some example embodiments, the modular platform (301) may further comprise internal waveguides to enable the intra commute in a hex compute.

The internal waveguides may include rectangular waveguide circular waveguide, elliptical waveguide, single-ridged waveguide, double-ridged waveguide and the like. The internal waveguides transmission configuration may include but not limited to electrical, optical and the like. In some example embodiments, the modular platform may further comprise a heat sink (not shown in the drawings) to provided dedicated cooling for the hex compute.

The plurality of components (303) may be divided into one or more rows of sub components (303*a*, 303*b*, 303*c* and 303*d*) as shown in the FIG. 3. The plurality of components (303) enables communication with the one or more other hex commute. In some example embodiment, the communication with the other hex commute may be referred as inter commute with one or more other hex compute. In one embodiment, each side of the six sides of the modular platform (301) comprises one or more rows for sub-components.

In one embodiment, each side of the six sides of the modular platform (301) comprises four rows (a,b,c,d) respectively for sub components (303*a*, 303*b*, 303*c* and 303*d*) as shown in the FIG. 3.

Communication Component (303*a*) on First Row (a) of the Platform (301), Communication Component (303*b*) on Second Row (b) of the Platform (301), Communication Component (303*c*) on Third Row (c) of the Platform (301), and Communication Component (303*d*) on Fourth Row (d) of the Platform (301).

For example, a first row (a) of sub component (303*a*) of the one or more rows of sub components (i.e collectively referred as 303) may comprise primary commute to enable communication with other hex computes. In some example embodiments, the primary commute may comprise but not limited to electrical and optical interconnections, especially transmitters with or without a waveguide. In some example embodiment, the medium of communication may be free space.

For example, a second row (b) of sub component (303*b*) of the one or more rows of sub components (i.e collectively referred as 303) may comprise driver/enabler for the primary commute to enable communication with other hex computes.

For example, a third row (c) of sub component (303*c*) of the one or more rows of sub components (i.e collectively referred as 303) may comprise a secondary compute to enable communication with other hex computes. In some example embodiment, the secondary commute may comprise but not limited to electrical and optical interconnections, especially receivers with or without a waveguide. In some example embodiment, the medium of communication may be free space.

For example, a fourth row (d) of sub component (303b) of the one or more rows of sub components (i.e collectively referred as 303) may comprise driver/enabler for the secondary commute to enable communication with other hex computes.

In an example embodiment, the modular block (305) may comprise one or more processors (201). The modular block (305) may be the same as the processor (201) of the FIG. 2. In some example embodiment the modular block (305) may be placed to enable easy reconfiguration of the hex compute. For example, in order to upgrade the hex compute, the modular block (305) (i.e. FPGA) may be replaced with another modular block (305) (i.e. ASIC) which has better performance or perform required tasks. Similarly, ASIC can be replaced with FPGA.

Further, the platform may comprise at least one memory configured to store instructions and at least one processor configured to execute the instructions regarding one or more operations including but not limited to computing, communication and the like.

In one embodiment, the modular platform (301) comprises one or more memory (3011).

In one embodiment, the modular platform (301) comprises one or more processor (3012).

The memory (3011) is configured to store instructions and the processor (3012) is configured to execute the instructions regarding one or more operations of the modular platform (301) including but not limited to computing, communication and the like.

A modular network environment (100) can be formed by modular systems M1 and M2. In some example embodiments the network may be formed by one more modular system (hex computes) discussed in the FIG. 3. Thus, plurality of modular systems (Mn) can be connected to form a modular compute (hex compute).

Further, plurality of modular computes (M) can be connected in a network of the system.

FIG. 4 illustrates a modular network environment (100a) formed by seven modular systems (i.e modular systems M1-M7). In some example embodiments the network may be formed by one more hex computes discussed in the FIG. 3. Further, FIG. 4 illustrates a scenario (100a) of a typical data center. The modular network of hex computes (i.e 403a to 403b) is placed on a server rack (409) in a server self (401). In some example embodiment, the server shelf (401) may have a plurality (n) of server racks.

As shown in the Figure, the network environment (100a) of the system comprises seven modular systems as follows:
First Modular System (M1) with First Modular Block (3051)
Second Modular System (M2) with Second Modular Block (3052)
Third Modular System (M3) with Third Modular Block (3053)
Fourth Modular System (M4) with Fourth Modular Block (3054)
Fifth Modular System (M5) with Fifth Modular Block (3055)
Sixth Modular System (M6) with Sixth Modular Block (3056)
Seventh Modular System (M7) with Seventh Modular Block (3057)

The modular network formed by the plurality of hex computes or modular computes (Mn) enable rapid and intensive cooling.

In the above said system, any two or more of the seven modular systems (M1,M2,M3,M4,M5,M6 and M7) cane be active modular system having reconfigurable block (305). In the above shown system of FIG. 4, two hex computes/ modular systems (403a to 403b) are active.
Hex compute (403a)=First Modular System (M1) with First Modular Block (3051)
Hex compute (403b)=Third Modular System (M3) with Third Modular Block (3053)

Thus, in one embodiment, placing one or more first reconfigurable block of one or more reconfigurable blocks on a first modular platform comprises placing Hex compute (403a).

Thus, in one embodiment, placing one or more second reconfigurable block of one or more reconfigurable blocks on a second modular platform comprises placing Hex compute (403b).

For example, in an example embodiment, the modular network (100, 100a) of hex computes comprise individual cooling unit for each of the hex computes. The distributed cooling mechanism works superior to state of the art centralized cooling system. Further, the inter hex commute enabled based on the primary commute and the secondary commute provided efficient execution of various tasks.

Further the modular network (100) comprises explicit I/O ports (i.e. VGA port and USB port) one various computes to enable communication with including but not limited to externals device and peripheral devices. The I/O ports may further include VGA, DVI, HDMI, USB and the like. The hex computes in the modular network may also comprise multimedia devices such as webcams, digital cameras, MIDI ports, microphones, sound cards, and video capture cards.

The system as shown in FIG. 4 comprises I/O ports for communication such as I/O ports (405) and (407) which may include a standard communication such as serial connection ports, USB ports, ethernet ports etc.

In accordance with some example embodiment, the modular network (100a) of FIG. 4 may be formed based on any permutation and combination of hex computes. Throughout the disclosure hex compute may refer to modular compute or modular system. In accordance with an example embodiment, due to reconfigurability of the hex compute achieved based on the modular block (305) and the plurality of components (303) placed on the modular platform (301), the network enables flexibility in operation and execution of one or more tasks.

For example, a first requirement demands a modular network formed by two modular computes. Addition of a requirement may be catered by adding another hex compute having capability to serve the requirement, without altering the architecture of the modular network. In accordance with an embodiment, consider a server catering say 1000 users. Addition of few thousand users in a short time period may easily be catered by addition of extra hex computes. In some example embodiments, based on requirements hex computes my perform communication and other related operations as well. Hence the technical improvement observed in a network of hex computes provides flexibility not only in terms of operations and use, but also in terms of network configuration and formation.

Further, a computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In another aspect the invention provides a method for enabling reconfigurable and flexible modular compute for high-performance computing.

The said method for enabling reconfigurable and flexible modular compute comprises the steps of:

Step-501: placing one or more first reconfigurable block of one or more reconfigurable blocks on a first modular platform;

Step-503: placing one or more second reconfigurable block of one or more reconfigurable blocks on a second modular platform;

Step-505: placing a plurality of components surrounding the first reconfigurable block and the second reconfigurable block on the respective the first modular platform and the second modular platform;

Step-507: configuring one or more interconnections between the plurality of components to form a modular network.

Figure 5:
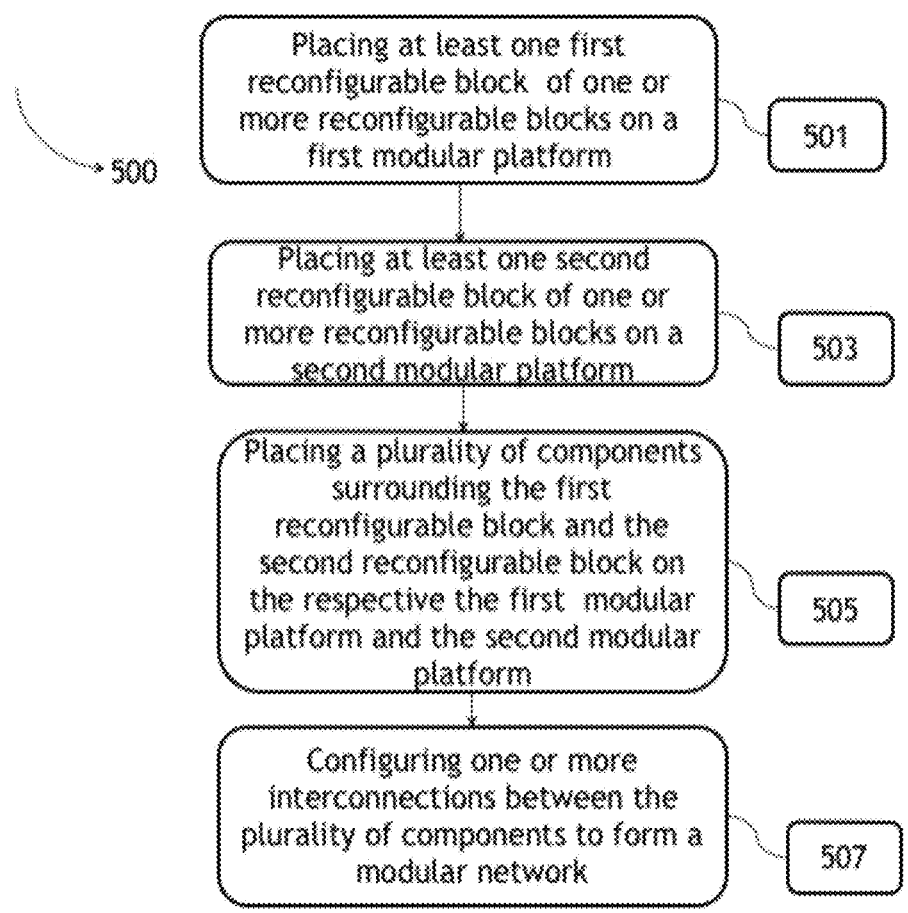
FIG. 5 illustrates a flowchart for a. method of enabling reconfigurable and flexible modular compute, in accordance with an example embodiment.

FIG. 5 illustrates a flowchart for a method of enabling reconfigurable and flexible modular compute (M). In accordance with an embodiment, at step 501 the method includes placing at least one first reconfigurable block (i.e. 3051 in first modular system M1 i.e. 403a) of one or more reconfigurable blocks (M1, M2, . . . Mn) on a first modular platform.

In accordance with an embodiment, at step 503 the method includes placing at least one second reconfigurable block (3053 in second modular system M3 i.e. 403b) of one or more reconfigurable blocks on a second modular platform.

In accordance with an embodiment, at step 505 the method includes placing a plurality of components (303 of FIG. 3) surrounding the first reconfigurable block (3051 of M1) and the second reconfigurable block (3053 of M3) on the respective the first modular platform and the second modular platform.

In accordance with an embodiment, at step 507 the method includes configuring one or more interconnections between the plurality of components (303) to form a modular network (i.e. modular network (100a) as shown in FIG. 4).

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

FIG. 6 generally illustrates a server rack of a modular network environment (100b) formed by two clusters (Cluster A and Cluster B) of modular computes (M) communicatively configured and interconnected on a server rack, each cluster comprising seven modular systems (M1, M2, . . . M7), in accordance with an example embodiment.

Each can be seen cluster A and cluster B, each comprises seven modular systems (referred as 601, 603, 605, 607, 609, 611 and 613) wherein each single modular system comprises a modular platform having six sides; and each side of the modular system comprises communication interface which enables to communicate between the modular systems of a single cluster A or B; and also enables communication between the two cluster A and Cluster B.

Similarly, many clusters may be connected and a modular network can be formed using the modular system and modular compute of the present invention and the system can be performed by the method of the present invention as shown in FIG. 5 and as described above.

Flexibility is enabled by virtualizing the networking and computing resources, such as bandwidth, routing functions, servers, and storage, and combining them dynamically in order to create new services, balance loads, recover from failures, and so on. This architecture can dynamically alter the server resources to meet changes such as the adoption of new services and a rapid change in service traffic due to a disaster. Moreover, some data-handling functions such as high-performance packet processing could be performed utilizing this architecture.

Reconfigurability is a spectrum of activities ranging from initial configuration, through in-system changes in functional design (complete and partial reconfiguration), to include updating parameters within a reconfigurable device (such as table entries). By reconfiguration, it refers to selecting one option from a given to change the operation of an element.

Modular network design involves creating units that can then be put together to meet the requirements of the entire network.

Modules are analogous to building blocks of different shapes and sizes. Each block might be used in multiple places, saving time and effort in the overall design and building process. The reconfigurable blocks have standard interfaces to each other so that they fit together easily. If the requirements for a configurable block change, only that block needs to change—other blocks are not affected. Similarly, a specific reconfigurable block can be removed or added without affecting other reconfigurable blocks of the system.

The Modular, Reconfigurable compute unit allows developers to build sophisticated applications for AI/ML/HPC. Compute Unit can be a high performance, low power, interconnected System-in-Package (SIP) that can be scaled up for future computing needs. Compute Unit combines a custom Processor with Terabit IO bus to obtain high performance/watt interconnect. The Compute Unit can be scaled by assembling self-similar (low-cost of manufacturing) SIPs. The compute unit can be configured in a 3D array with pre-defined orientation to enable coupling between SIPs. The orientation data can be provided by a User Interface dashboard. Each SIP comes pre-loaded with specific application libraries that are proprietary for LightspeedAI.

In summary, reconfigurable electronics provides the computing power and the interconnect bandwidth and the 3D-System-in-Package (3DSIP) provides up-to 20× performance at half the power in a small form factor offering high compute density needed in the data centers with increased flexibility in system design, topologies, architecture.

Advantages

A modular design for a network has many benefits, including the following:
   It is easier to understand and design smaller, simpler modules rather than an entire network.
   It is easier to troubleshoot smaller elements compared to the entire network.
   The reuse of blocks saves design time and effort, as well as implementation time and effort.
   The reuse of blocks allows the network to grow more easily, providing network scalability.
   It is easier to change modules rather than the entire network, providing flexibility of design.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A system for enabling reconfigurable and flexible Modular Computes in a network environment for high performance computing, wherein the system comprises components:
   plurality of modular systems, each modular system of the plurality of modular systems comprises:
      one or more reconfigurable blocks;
      a communication interface to enable the internal and external communications of each modular system;
      a hexagonal modular platform with communication components, wherein each side of the hexagonal modular platform comprises four rows comprising four groups of communication components distributed as follows:
         communication component on first row of the hexagonal modular platform,
         communication component on second row of the hexagonal modular platform,
         communication component on third row of the hexagonal modular platform, and
         communication component on fourth row of the hexagonal modular platform; and
      a reconfigurable block of the one or more reconfigurable blocks and communication interface are distributed on the hexagonal modular platform forming a modular system of the plurality of the modular systems;
   peripheral equipment to send and receive data/information; and
   remote device for user to send and receive notifications and communicate remotely;
   all system components communicatively coupled through a network forming a modular network environment,
   wherein the network enables each of the system components to send and receive data/information between the system components for communications;
   wherein each modular system is configurable, reconfigurable, and replaceable independently, without altering an architecture of the modular network created within the network environment, and
   wherein the network environment comprises multiple clusters of modular systems, wherein each cluster comprises a group of modular systems, able to communicate among the clusters and also within the modular systems of a single cluster.

2. The system of claim 1, wherein each of the reconfigurable blocks of each modular system comprises:
   one or more memories to store instructions, and
   one or more processors configured to execute the instructions stored in the one or more memories.

3. The system of claim 1, wherein each of the communication components comprises a plurality of subcomponents distributed in four row(s) on each side of six sides of the hexagonal modular platform.

4. The system of claim 1, wherein the network environment is a data center, and wherein the network is formed on server shelf having one or more server racks.

5. A method of geometrically arranging each modular system and one or more reconfigurable blocks of the system of claim 1, wherein the method comprises:
   placing one or more first reconfigurable blocks of the one or more reconfigurable blocks on a first modular platform;
   placing one or more second reconfigurable blocks of the one or more reconfigurable blocks on a second modular platform;
   placing a plurality of components surrounding the first reconfigurable block and the second reconfigurable block on the respective first modular platform and second modular platform; and
   configuring one or more interconnections between the plurality of components to form a modular network.

6. A reconfigurable and flexible Modular compute comprising a plurality of modular systems in a network environment for computing, wherein each modular system of the plurality of modular systems comprises:
   one or more reconfigurable blocks;
   a communication interface to enable the internal and external communications of each modular system;
   a hexagonal modular platform with communication components, wherein each side of the hexagonal modular platform comprises four rows comprising four groups of communication components distributed as follows:
      communication component on first row of the hexagonal modular platform,
      communication component on second row of the hexagonal modular platform,
      communication component on third row of the hexagonal modular platform, and
      communication component on fourth row of the hexagonal modular platform; and
   a reconfigurable block of the one or more reconfigurable blocks and communication interface are distributed on the hexagonal modular platform forming a modular system of the plurality of modular systems;
   peripheral equipment to send and receive data/information, and
   remote device for user to send and receive notifications and communicate with the modular compute or modular system remotely,
   all system components communicatively coupled through a network forming a modular network environment, wherein the network enables each system component to send and receive data/information between the system components for communications, wherein each modular system is configurable, reconfigurable, and replaceable independently, without altering an architecture of the modular network created within the network environment, and wherein the network environment comprises multiple clusters of modular systems, wherein each cluster comprises a group of modular systems, able to communicate among the clusters and also within the modular systems of a single cluster.

7. The reconfigurable and flexible Modular compute of claim 6, wherein the modular system of the plurality of modular systems enables convenient and flexible addition or removal or upgrading of the one or more modular systems without altering the architecture of the modular network present within the network environment.

8. The reconfigurable and flexible Modular compute of claim 6, wherein the hexagonal modular platform comprises: communication components surrounding the reconfigurable block, wherein configuration of one or more interconnections between the communication components of the hexagonal modular platform and also with the communication interface forms a modular network.

9. The reconfigurable and flexible Modular compute of claim 6, wherein each of the communication components comprises a plurality of subcomponents distributed in four row(s) on each side of six sides of the hexagonal modular platform.

10. The reconfigurable and flexible modular compute of claim 6, which comprises:
- a first reconfigurable block of the one or more reconfigurable blocks on a first modular platform;
- a second reconfigurable block of the one or more reconfigurable blocks on a second modular platform;
- a plurality of components surrounding the first reconfigurable block and the second reconfigurable block on the respective first modular platform and second modular platform;
- one or more interconnections between the plurality of components to form a modular network;
- one or more peripheral units that communicate to external entities; and
- a system being capable of configured remotely or locally.

* * * * *